(12) United States Patent
Risch et al.

(10) Patent No.: US 6,697,555 B2
(45) Date of Patent: Feb. 24, 2004

(54) SILICONE WATERBLOCKING GEL FOR LOW TEMPERATURE FIBER OPTIC CABLES

(75) Inventors: Brian Risch, Hickory, NC (US); George J. Dallas, Claremont, NC (US)

(73) Assignee: Alcatel, Paris (FR)

( * ) Notice: Subject to any disclaimer, the term of this patent is extended or adjusted under 35 U.S.C. 154(b) by 137 days.

(21) Appl. No.: 10/028,362

(22) Filed: Dec. 28, 2001

(65) Prior Publication Data

US 2003/0123821 A1 Jul. 3, 2003

(51) Int. Cl.⁷ .................................................. G02B 6/44
(52) U.S. Cl. ...................................................... 385/100
(58) Field of Search ......................................... 385/100

(56) References Cited

U.S. PATENT DOCUMENTS

| | | |
|---|---|---|
| 4,374,967 A | 2/1983 | Brown et al. |
| 4,464,013 A | 8/1984 | Sabia |
| 4,613,659 A | 9/1986 | Lee et al. |
| 4,703,997 A | 11/1987 | Ijiri et al. |
| 4,718,747 A | 1/1988 | Bianchi et al. |
| 4,725,123 A * | 2/1988 | Anelli et al. ............. 350/96.23 |
| 5,495,546 A | 2/1996 | Bottoms, Jr. et al. |
| 5,905,833 A | 5/1999 | Sheu |
| 6,052,502 A | 4/2000 | Coleman |
| 6,060,662 A | 5/2000 | Rafie et al. |
| 6,137,936 A | 10/2000 | Fitz et al. |
| 6,160,939 A | 12/2000 | Sheu |
| 6,253,012 B1 | 6/2001 | Keller et al. |

FOREIGN PATENT DOCUMENTS

GB    2 046 471 A    11/1980

OTHER PUBLICATIONS

Information About Dow Corning® Brand Silicone Encapsulants; XP–002235120; Mar. 17, 2003; p. 1–8.
Sylgard 184 hochtransparentes RTV–Silikon,; Mar. 17, 2003; p. 1,2.

* cited by examiner

Primary Examiner—Javaid H. Nasri
(74) Attorney, Agent, or Firm—Sughrue Mion, PLLC

(57) ABSTRACT

Fiber optic cable containing optical fibers and a silicone waterblocking gel for low temperature applications. The silicone waterblocking gel has an extremely low crystalline melting point and may be used in low temperature environments since it does not experience low temperature attenuation caused by crystallization of the base oil at temperatures below about −45° C. Examples of the waterblocking silicone gel are poly(alkyl)(aryl)siloxane and mono or polyhalogenatedsiloxane.

16 Claims, 1 Drawing Sheet

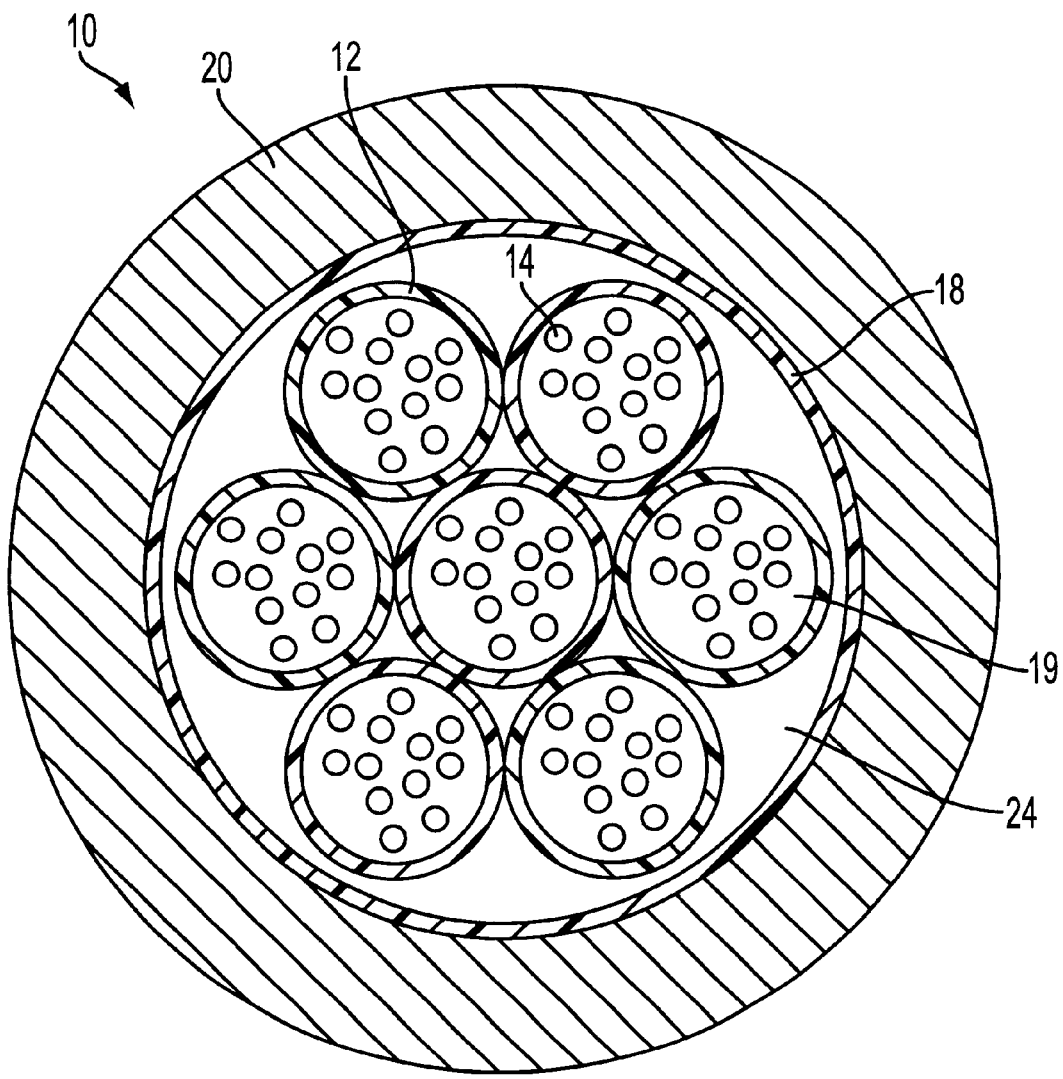
FIGURE

SILICONE WATERBLOCKING GEL FOR LOW TEMPERATURE FIBER OPTIC CABLES

BACKGROUND OF THE INVENTION

1. Field of the Invention

This invention relates to an optical cable that includes one or more optical fibers surrounded by a silicone waterblocking gel filling material that has excellent low temperature stability.

2. Discussion of Related Art

Optical fibers are very small diameter strands, typically made of glass, which are capable of transmitting an optical signal over great distances, at high speeds, and with relatively low signal loss as compared to standard wire or cable networks. The use of optical fibers in today's technology has developed into many widespread areas, such as: medicine, aviation, communications, control applications, etc. Many of the areas of use for optical fibers require that the optical fibers be protected from various destructive factors, such as adverse weather, moisture, impact damage, heat, cold, etc.

Optical cables include a core having one or more optical fibers within a sheath system, which -surrounds and protects the fibers. In the cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level within the cable, especially if a plastic jacket is the only barrier to the ingress of the moisture. Water may also enter the cable because of rodent attacks or mechanical impacts that cause openings in the sheath system. While the presence of water within an optical cable may not immediately impact its performance, the passage of the water along the cable interior to connection points or terminals or associated equipment inside closures, for example, may cause problems, especially in freezing environments and should be prevented.

One way to protect optical fibers is to have a waterblocking gel (also called a water resistant gel) placed around the individual fibers or around groups of fibers. This waterblocking gel minimizes the amount of water or moisture that enters the fiber optic cable and protects the fibers from impact damage during installation, storage, repair, etc. Various materials have been used to fill cable cores to prevent the ingress of water with varying degrees of success.

U.S. Pat. No. 5,574,816 discloses a buffer tube for an optical fiber cable made from a polypropylene-polyethylene copolymer resin (a modified nucleated isotactic polypropylene (i-PP)) having nucleating agents and filler materials disbursed therein. Although materials like i-PP can enable the manufacture of low cost buffer tubes, such material is not compatible with many traditional, low cost polyolefin based waterblocking compounds. The incompatibility is caused by favorable interactions between polyolefin based water blocking gels and the i-PP buffer tube material. As an alternative, polyol based water blocking gels have been developed which offer better compatibility because such materials have a less favorable interaction with the i-PP material. See U.S. Pat. Nos. 5,348,669, 5,433,872 and 5,672,640. However, polyol based gels are generally more compatible with water and therefore allow greater amounts of water to be absorbed into the gels. Additionally, polyol gels may have a greater cost.

U.S. Pat. No. 5,905,833 discloses a filling material which comprises at least two different hydrocarbons as an oil constituent and/or two different fumed silicas as part of a thickening agent. U.S. Pat. No. 5,905,833 alleges that their filling material has enhanced performance at low temperature because of the use of a combination of oils having low resulting pour point and has a high cable drip temperature and very low oil separation.

U.S. Pat. No. 6,160,939 discloses a filling material including one or more synthetic oils and an organic gelling agent (a diblock copolymer).

U.S. Pat. No. 6,085,009 discloses a water blocking gel which is compatible with polyolefin optical fiber cable buffer tubes. The water blocking gel comprises a certain polyolefin oil, a thixotropic agent, and a thermal oxidation stabilizer.

U.S. Pat. No. 5,495,546 discloses a tube containing optical fibers and a flexible, dielectric, water-blocking compound, such as a silicone gel, to prevent migration of water through the tube.

U.S. Pat. No. 6,137,936 discloses filling empty spaces within a buffer tube with a thixotropic polyalphaolefin (PAO) based or a thixotropic silicone oil-based gel filling compound.

UK Patent Application GB 2,046,471 discloses a thixotropic fluid surrounding optical fibers, where the fluid is a colloidal solution or suspension, preferably a silicone oil containing a colloidal suspension of silica, and more preferably incorporating silanol groups in its chemical constitution.

U.S. Pat. No. 4,703,997 discloses an optical fiber cable comprising a water blocking layer, an optical fiber disposed inside the water blocking layer and a water blocking material filling the space between the water blocking layer and the optical fiber, the water blocking material having a specific apparent viscosity and a specific worked penetration.

U.S. Pat. No. 4,374,967 discloses a low-temperature dielectric silicone gel which is the reaction product of a polyorganosiloxane consisting essentially of $Me_2SiO$, $MeSiO_{1.5}$, $Me_3SiO_{0.5}$ and $Me_2ViSiO_{0.5}$, an organohydrogensiloxane and a platinum catalyst.

U.S. Pat. No. 6,052,502 discloses a water blocking material, preferably a thixotropic material, for example, a silicone gel or a petroleum based material.

U.S. Pat. No. 4,718,747 discloses protective coatings, including layers of silicone rubber or nylon and fillers such as a non-vulcanized thermoplastic compound of ethylene-propylene or polyvinylchloride or a waterblocking filler, such as petroleum jelly or a silicone grease which may include a swelling agent, such as carboxymethylcellulose, etc.

U.S. Pat. No. 4,613,659 discloses a polymethylsiloxane containing silicon-bonded hydrogen consisting of 84 to 96 mole percent dimethylsiloxane units, 2 to 10 mole percent methylsilsesquioxane units, 0.5 to 6 mole percent trimethylsiloxy units, and 0.25 to 3 mole percent monohydrogendimethylsiloxy units, where the total mole percent of trimethylsiloxy units and monohydrogendimethylsiloxy units is at least 1.5.

U.S. Pat. No. 4,464,013 discloses a filling composition containing a styrene based rubber-styrene block copolymer and an oil used to prevent water entry into optical fiber cable.

A cable filling material, especially an optical fiber cable filling material, should meet a variety of requirements.

Filling materials for use in optical fiber cables should yield under strains that are experienced when the cable is made or handled. Otherwise, movement of the optical fibers within the cable would be prevented and the fibers would buckle because they contact a surface of the unyielding filling material. Filling materials should also have a relatively low shear modulus. Further, the critical-yield stress may also need to be controlled.

The optical fiber cable filling composition of matter should also not bleed and not drip from the cable core at elevated temperatures. The waterblocking gel should also have good viscosity characteristics at higher temperatures (above 70° C.) to avoid having the gel lose its protective characteristics. Another desirable property of the filling material is thermal oxidation resistance.

Water blocking gels for optical fiber cables must also be compatible with the other components of the optical fiber cable, such as buffer tubes, for example, buffer tubes made from polyolefin materials.

It is also desirable that the filling material be substantially free of syneresis, which is to say that it should have uniform consistency over a predetermined temperature range.

Traditionally, three types of waterblocking gels have been used in fiber-optic cables: (1) Gels based on polar oils such as polyols; (2) Gels based on natural or synthetic hydrocarbon oils; and (3) Gels based on silicone oils. In service, the lowest useable temperature of each of these gels is based on the glass transition temperature or on the crystalline melting point of the base oil. Once an oil goes below its glass transition temperature or its crystalline melting point, the oil becomes a solid thereby causing attenuation in the fiber optic elements that can be as high as several decibels per kilometer. U.S. Pat. No. 6,160,939, to Sheu, discloses that known acceptable temperature ranges for optical fiber filling materials are from about −40° C. to about 80° C. Silicone oils have the advantage of having an extremely low glass transition temperature (about −125° C.). However, silicone oils have a crystallization temperature (melting point) of about −45° C., thereby effectively limiting the service temperature of cables using silicone gels to temperatures above this.

SUMMARY OF THE INVENTION

An object of the present invention is to provide a means to utilize silicone based waterblocking gels in fiber optic cables without experiencing low temperature attenuation caused by crystallization of the base oil at temperatures below about −40° C. The use of the silicone gel of the present invention gives the additional advantages of an extremely low glass transition temperature, inherent flame retardancy, good fiber protection from moisture, and compatibility with a wide range of buffer tube materials.

Thus, one embodiment of the present invention is a fiber optic cable that contains at least one optical fiber and a waterblocking silicone gel of polysiloxane based composition that has a crystallization temperature below −40° C.

An additional embodiment of the present invention is a fiber optic cable that contains at least one optical fiber and a waterblocking silicone gel that has a crystallization point at a temperature below −40° C., and is at least partially composed of poly(alkyl)(aryl)siloxane.

An additional embodiment of the present invention is a fiber optic cable that contains at least one optical fiber and a waterblocking silicone gel that has a crystallization point at a temperature below −40° C., and is at least partially composed of halogenated siloxane (mono or polyhalogenated siloxane).

BRIEF DESCRIPTION OF THE DRAWINGS

The FIGURE, not drawn to scale, is a cross-sectional schematic diagram illustrating an optical fiber cable having a plurality of buffer tubes, optical fibers and a water blocking gel.

DETAILED DESCRIPTION OF THE PRESENT INVENTION

The fiber optic cables of the present invention contain a silicone based waterblocking gel that has crystallization starting at a temperature below about −35° C. Preferably, the waterblocking gel has crystallization occurring at a temperature in the range of from −35° C to −55° C. More preferably, the waterblocking gel has a crystallization point at a temperature below −40° C. More preferably, the waterblocking gel has a crystallization point at a temperature below −50° C. Most preferably, the waterblocking gel has an onset of crystallization point at a temperature of −50° C. or below.

The silicone based waterblocking gels of the present invention either depress the crystallization point by blending with lower crystallization point siloxanes or are siloxanes that intrinsically have a lower crystallization point. The blending is analogous to a freezing point depression more commonly observed in glycol/water and salt/water mixtures. The blending can also just reduce the percentage of crystallizable material so the physical change still leaves the total mixture flexible enough so it does not effect the optical fibers. The structural changes to the polymer of the present invention include both linear copolymers and branched copolymers. One purpose is to remove the regularity in the polymer backbone that allows crystallization. For example, short chain branching in the 3,3,3 trifuoropropyl group of FF157™ leads to almost total elimination of an observable crystallization point, and causes a decrease in crystallization point about −75° C. Both techniques would allow the siloxane gel to be flexible at lower use temperatures and reduce the rapid increase in viscosity that occurs between −35° C. to −45° C. with the poly(dimethyl siloxane) compositions of the prior art. This increase in viscosity corresponds to the onset of crystallization and the introduction of solid crystalline particles into the gel. The hardening of the gel and formation of crystalline particles can cause attenuation in optical fibers from 0.025 dB/km to >20 dB/km for aged buffer tube units, such as aged at (−40° C. for 4 days) or (−45° C. for 5 days).

The lowest temperature to which the waterblocking gels of the present invention may be used is the glass transition temperature of the waterblocking gel. Silicone oils have a glass transition temperature of about −125° C. which gives these gel compositions a theoretical lower limit well below what is possible for other waterblocking gel compositions.

In the poly(alkyl)(aryl)siloxane for use in the fiber optic cable of the present invention, preferably the alkyl group has a carbon number of 1 to 6, more preferably a carbon number of 1 to 3. The alkyl groups may be branched -or unbranched, cyclical or straight chain and substituted or unsubstituted. Most preferably the alkyl group is a methyl group. Other non-limiting examples of alkyl groups include an ethyl group, a propyl group, an isopropyl group, a butyl group, an isobutyl group, an n-butyl, a tert-butyl group, a 2-methylpropyl group, a pentyl group, a neopentyl group, a hexyl group, a heptyl group, an octyl group, a nonyl group, a decyl group and a dodecyl group, and cycloalkyl groups such as a cyclopentyl group, a cyclohexyl group and a cycloheptyl group.

In the poly(alkyl)(aryl)siloxane for use in the fiber optic cable of the present invention, it is believed that the aryl group creates a large bulky substituent group which assists in decreasing the crystalline melting point of a polysiloxane over a polysiloxane that does not contain such an aryl group. Non-limiting examples of aryl groups include a phenyl group, a tolyl group, a xylyl group, a naphthyl group and a biphenylyl group. The aryl group may be substituted or unsubstituted. Most preferably the aryl group is a phenyl group.

The polymers have a viscosity range from 50 to 100,000 centistrokes at 25° C. and a number average molecular weight from less than 3,000 to 150,000 g/mole.

In the mono or polyhalogenated siloxane for use in the fiber optic cable of the present invention, the halogen group may be any halogen group. Preferably the siloxane is a polysiloxane. Preferably, the halogen group is a chlorine atom or a fluorine atom. More preferably, the polyhalogenated siloxane is a polyfluorinated siloxane. In the polyfluorinated siloxane, preferably, the fluorinated group is a fluoroalkyl group. More preferably, a fluoropropyl group, most preferably a trifluoropropyl group. The polyfluorinatedsiloxane preferably contains an alkyl group substituted with fluorine atoms, preferably a branched alkyl group substituted with fluorine atoms.

A specific example of a poly(alkyl)(aryl)siloxane of the present invention is poly(methyl)(phenyl)siloxane.

While the present invention is the first use of poly(alkyl)(aryl)siloxanes as a fiber optic cable waterblocking material, poly(alkyl)(aryl)siloxanes are known in the art for other unrelated applications and one skilled in the polymer art would be able to make poly(alkyl)(aryl)siloxanes. They are also generally available for sale. For example, poly(methyl)(phenyl)siloxane may be purchased from the General Electric Corporation as VISCASIL™ Grade SF8843.

A specific example of a polyfluorinatedsiloxane of the present invention is poly(trifluoropropyl)siloxane. Poly(trifluoropropyl)siloxane has a crystallization point of −75° C.

While the present invention is the first use of halogenated siloxane as a fiber optic cable waterblocking material, halogenated siloxanes are known in the art for other unrelated applications and one skilled in the polymer art would be able to make halogenated siloxanes. They are also generally available for sale. For example, poly(trifluoropropyl)siloxane may be purchased from the General Electric Corporation as FF157™.

The poly(alkyl)(aryl)siloxanes and halogenated siloxanes may be used in combination with each other and in combination with other, separate, types of polysiloxanes. A preferable type of polysiloxane for use in combination is a polydimethylsiloxane and polyhydrogenmethylsiloxane, most preferably polydimethylsiloxane. When the poly(alkyl)(aryl)siloxane and poly(halogenated)siloxane are use with other types of polysiloxanes, the amount of poly(alkyl)(aryl)siloxane and poly(halogenated)siloxane must be sufficient to provide a waterblocking gels that do not crystallize at the temperatures discussed above. The amount of poly(alkyl)(aryl)siloxane and poly(halogenated)siloxane added may be as low a 5 or 10% or up to 90% or above. For example the amount added maybe in the range of from 20 to 60%.

Preferably, the amount of poly(alkyl)(aryl)siloxane and poly(halogenated)siloxane is 30% or greater, by weight, based on the total amount of polysiloxanes present in the waterblocking silicone gel, more preferably 40% or greater. Such as 40%, 50% and 60%.

The final composition may contain from 1 to 20 weight percent of pyrogenic silica or some other yield-stress modifier to alter the Theological properties of the final gel and impart an appropriate yield stress to prevent dripping of the gel.

The preferred poly(alkyl)(aryl)siloxane is miscible in polydimethylsiloxane.

The silicone based gels of the present invention are also inherently flame retardant, unlike hydrocarbon and polar oil based gels.

The silicone based gels of the present invention may also contain additives, such as antioxidants, bleeding inhibitors, swelling agents, thickening agents, fillers, etc. The silicone based gels of the present invention do not interact with additives or reduce the stability of the buffer tubes. The waterblocking gels of the present invention are compatible with soft polyolefin buffering materials.

In the cable varieties in which the optical fibers are housed in a buffer tube, the primary function of the buffer tubes is to protect the delicate optical fibers housed therein.

The FIGURE illustrates an example of an optical fiber cable of the present invention. The cable 10 has a core comprised of a plurality of buffer tubes 12, each of which house optical fibers 14. A core wrap 18 may be positioned over the core. A protective outer jacket 20 is disposed over the core region on the exterior of the buffer tubes. Water blocking gels 19 are typically disposed within the buffer tubes 12. Water blocking gels may also be disposed within the core outside of the buffer tubes 24.

The present invention may be applied to any type of optical fiber cables configuration, such as: cables with a centrally located single buffer tube containing one or more optical fibers; cables with a plurality of buffer tubes stranded in any manner, such as a helical or alternating helical arrangement; cables containing a central strength member; and cables with slotted cores in which a plurality of optical fibers reside.

The present invention may be applied to an optical fiber cable configuration such as one having a buffer tube made from thermoplastic polyolefin elastomeric buffer material is disclosed. See, for example, U.S. Pat. No. 6,215,931, which is hereby incorporated by reference, and FLEXTUBE™, a product of Alcatel Corp.

By use of fiber optic cable with the waterblocking silicone gels of the present invention, fiber optic cable may be used in a wider range of applications, including for use in cold weather environments such as in Canada and Eastern Europe.

While the invention has been described in detail and with reference to specific embodiments thereof, it will be apparent to one of ordinary skill in the art that various changes and modifications can be made therein without departing from the spirit and scope of the invention. The FIGURE and examples recited herein are demonstrative only and are not meant to be limiting.

We claim:

1. A fiber optic cable comprising at least one optical fiber and a waterblocking silicone-based gel that has an onset of crystallization at a temperature below −40° C., wherein the waterblocking silicone-based gel contains a poly(alkyl)(aryl)siloxane composition.

2. The fiber optic cable of claim 1, wherein an alkyl group of the poly(alkyl)(aryl)siloxane is an alkyl group having a carbon number of 1 to 3.

3. The fiber optic cable of claim 2, wherein an alkyl group of the poly(alkyl)(aryl)siloxane is a methyl group.

4. The fiber optic cable of claim 1, wherein an aryl group of the poly(alkyl)(aryl)siloxane is a phenyl group.

5. The fiber optic cable of claim 1, wherein the poly(alkyl)(aryl)siloxane is a poly(methyl)(phenyl)siloxane.

6. The fiber optic cable of claim 1, wherein the waterblocking silicone-based gel further comprises an additional polysiloxane which is different than the poly(alkyl)(aryl)siloxane.

7. The fiber optic cable of claim 6, wherein said additional polysiloxane is poly(dimethyl)siloxane.

8. The fiber optic cable of claim 1, wherein the amount of poly(alkyl)(aryl)siloxane is 40% or greater, by weight, based on the total amount of polysiloxanes present in the waterblocking silicone gel.

9. A fiber optic cable comprising at least one optical fiber and a waterblocking silicone-based gel that has an onset of crystallization at a temperature below −40° C., wherein the waterblocking silicone-based gel contains a mono- or polyhalogenatedsiloxane.

10. The fiber optic cable of claim 9, wherein the polyhalogenatedsiloxane comprises halogen atoms selected from the group consisting of chlorine atoms and fluorine atoms.

11. The fiber optic cable of claim 9, wherein the waterblocking silicone-based gel contains a mono- or polyfluorinatedsiloxane.

12. The fiber optic cable of claim 11, wherein a fluorinated group of the polyfluorinatedsiloxane is a trifluoropropyl group.

13. The fiber optic cable of claim 12, wherein the polyfluorinatedsiloxane is poly(trifluoropropyl)siloxane.

14. The fiber optic cable of claim 11, wherein the waterblocking silicone-based gel further contains an additional polysiloxane which is different than the polyfluorinatedsiloxane.

15. The fiber optic cable of claim 14, wherein said additional polysiloxane is poly(dimethyl)siloxane.

16. The fiber optic cable of claim 14, wherein the amount of polyfluorinatedsiloxane is 40% or greater, by weight, based on the total amount of polysiloxanes present in the waterblocking silicone gel.

* * * * *